US008619686B2

(12) United States Patent
De Pasquale et al.

(10) Patent No.: US 8,619,686 B2
(45) Date of Patent: Dec. 31, 2013

(54) METHOD OF MANAGING BASEBAND RESOURCES IN MOBILE COMMUNICATIONS NETWORKS IMPLEMENTING INTERFERENCE CANCELLATION TECHNIQUES

(75) Inventors: Andrea De Pasquale, Madrid (ES); Francisco Javier Dominguez Romero, Madrid (ES); Beatriz Garriga, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 854 days.

(21) Appl. No.: 12/701,456

(22) Filed: Feb. 5, 2010

(65) Prior Publication Data

US 2010/0227624 A1  Sep. 9, 2010

(30) Foreign Application Priority Data

Feb. 5, 2009 (ES) .................................. 200900329

(51) Int. Cl.
*H04W 4/00* (2009.01)
*H04J 3/16* (2006.01)
*H04J 3/22* (2006.01)
*H04W 72/00* (2009.01)
*H04B 7/00* (2006.01)

(52) U.S. Cl.
USPC ........... 370/329; 370/437; 370/468; 455/450; 455/452.1; 455/452.2; 455/464; 455/512

(58) Field of Classification Search
USPC .......... 455/63.1, 452.2, 512, 513, 452.1, 450, 455/464, 509, 451, 455, 516; 370/329, 341, 370/395.41, 431, 437, 468, 335
See application file for complete search history.

(56) References Cited

U.S. PATENT DOCUMENTS

| 2002/0021673 | A1  | 2/2002  | Agin et al. |
| 2002/0111143 | A1  | 8/2002  | Li |
| 2002/0128014 | A1* | 9/2002  | Chen .............................. 455/447 |
| 2003/0231702 | A1  | 12/2003 | Oates et al. |
| 2004/0192315 | A1* | 9/2004  | Li et al. ......................... 455/447 |

(Continued)

FOREIGN PATENT DOCUMENTS

| EP | 1643363 A1 | 4/2006 |
| WO | WO02103920 A2 | 12/2002 |
| WO | WO 2008/096383 | * 8/2008 ............... H04Q 7/38 |

OTHER PUBLICATIONS

Extended European Search Report dated Jul. 5, 2010 issued in connection with corresponding European Patent Application No. 10 152 783.6.

(Continued)

*Primary Examiner* — Temesgh Ghebretinsae
*Assistant Examiner* — Devan Sandiford
(74) *Attorney, Agent, or Firm* — Workman Nydegger (57) ABSTRACT

A method of managing baseband resources in a mobile communications network, wherein at least one interference cancellation technique in uplink is available, the method comprising the steps of: when baseband resources are demanded by a mobile user, determining whether there are free baseband resources or not, and: if there are not free baseband resources, determining whether there is at least one interference cancellation process cancelling the interference caused by at least one mobile user or not, and: if there is at least one interference cancellation process cancelling the interference caused by at least one mobile user, one mobile user is removed from said interference cancellation process.

15 Claims, 5 Drawing Sheets

(56) References Cited

U.S. PATENT DOCUMENTS

| | | | |
|---|---|---|---|
| 2005/0036441 A1* | 2/2005 | Laroia et al. | 370/203 |
| 2007/0004416 A1* | 1/2007 | Nishimura et al. | 455/442 |
| 2007/0149207 A1* | 6/2007 | Weigand | 455/453 |
| 2008/0214197 A1* | 9/2008 | Englund et al. | 455/450 |
| 2009/0116440 A1* | 5/2009 | Zhao et al. | 370/329 |
| 2009/0117882 A1* | 5/2009 | Yamahira | 455/414.1 |
| 2010/0278152 A1* | 11/2010 | Andreozzi et al. | 370/335 |

OTHER PUBLICATIONS

Spanish Search report for 200900329 dated May 2, 2009.

* cited by examiner

METHOD OF MANAGING BASEBAND RESOURCES IN MOBILE COMMUNICATIONS NETWORKS IMPLEMENTING INTERFERENCE CANCELLATION TECHNIQUES

CROSS-REFERENCES AND RELATED APPLICATIONS

This application claims the benefit of Spanish Patent Application No. ES 200900329, filed Feb. 5, 2009, entitled "Method of Managing Baseband Resources in Mobile Communications Networks Implementing Interference Cancellation Techniques," which is incorporated herein by reference in its entirety.

FIELD OF THE INVENTION

Embodiments of the present invention relate to mobile or cellular telecommunications networks and in particular, to mobile or cellular telecommunications networks implementing interference cancellation techniques.

STATE OF THE ART

In mobile telecommunications networks there are two main capacity limits in the uplink: the baseband resources and the maximum interference (in 3G, the RTWP, Received Total Wideband Power) of the users. The baseband resources are fixed and known by the base station or Node B, while the maximum allowed interference (in dB) is a configurable parameter that cannot be exceeded.

For example, in UMTS the baseband consumption is due to different types of channels: the common channels, the dedicated channels (DCH) and the enhanced uplink dedicated channels (E-DCH), all of which share the same limited hardware resources. The dedicated and enhanced dedicated channels are summarized next.

In Release'99 of the UMTS standards, the dedicated channels (DCH), both uplink (UL) and downlink (DL), were first defined. They are allocated per user with a maximum data rate, a fixed amount of spreading codes and reserved baseband allocation. The maximum bit rate of a dedicated channel (DCH) is 384 Kbps.

Next, in Release 5 of the standards, the downlink HSDPA channels were defined.

Finally, the enhanced dedicated channels (E-DCH) were defined in Release 6. These channels are specific for uplink (also known as HSUPA). The E-DCH channels are quite dynamic and they do not have a fixed, reserved amount of resources. The network tries to maximise the use of the radio resources for the E-DCH users. In every TTI (Time Transmission Interval), the resources can be allocated to every user that demands to upload data. The maximum data rate in enhanced dedicated channels (E-DCH) is 5.7 Mbps with current modulation. If 16 QAM is used, this maximum data rate is foreseen to reach 11 Mbps.

In other words, the evolution of packet transmission in uplink in mobile telecommunications networks has led to the introduction of several new features aiming at increasing the uplink peak rate, amongst which we can currently find the enhanced dedicated channel (E-DCH) up to 5.76 Mbps as well as the future E-DCH using 16QAM reaching up to 11 Mbps.

Depending on the vendor implementation, the downlink channels share the same hardware resources with the uplink (UL) ones or not. As a consequence, dedicated channels (DCH) in downlink (DL) and HSDPA channels may also consume part of the baseband capacity.

Within this context, interference cancellation algorithms reduce the interference when decoding the data traffic of the users. It is to be remarked that the provision of such high peak rates (E-DCH at 5.76 Mbps and 11 Mbps) requires the introduction of interference cancellation techniques in order to guarantee the availability of these peak rates to a high amount of users (capacity) without producing too much interference and therefore reducing the coverage of the network.

Figure 1:
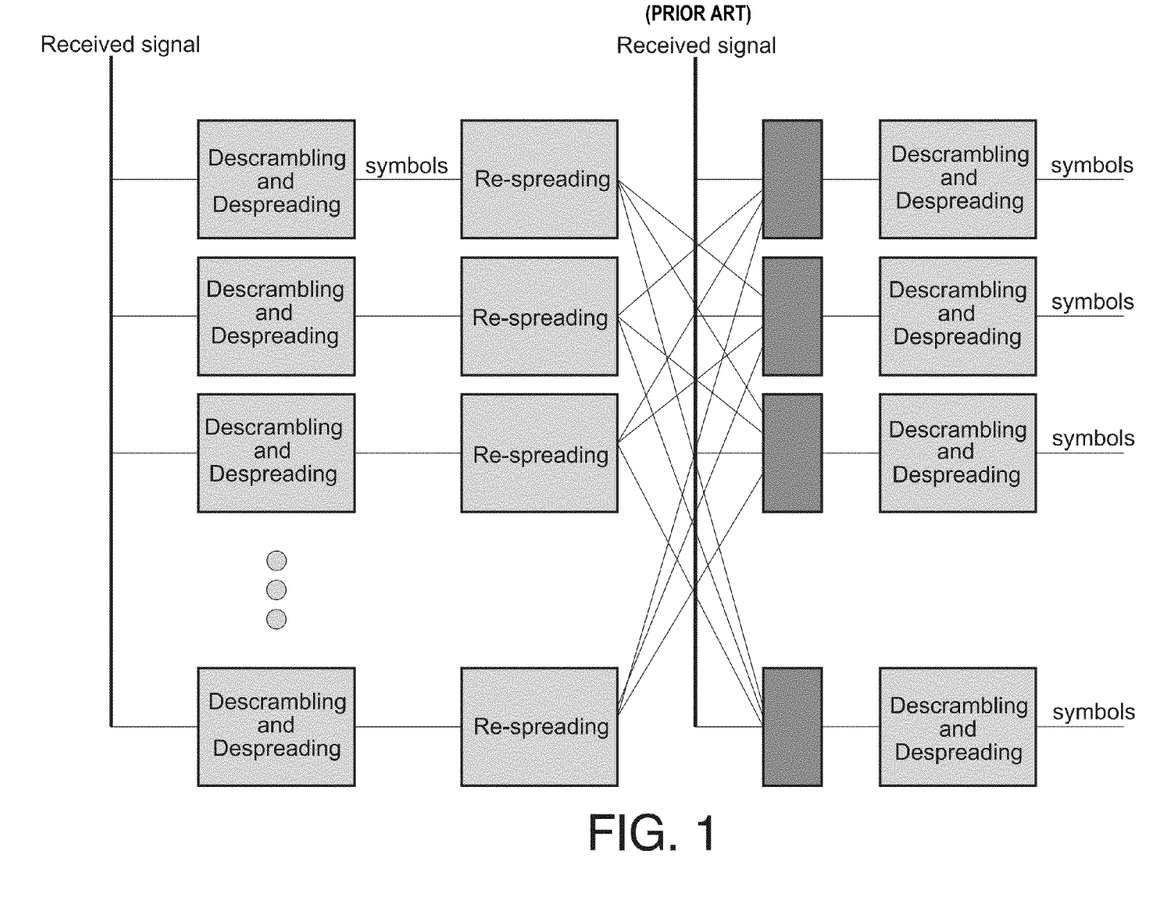
FIG. 1 shows a schematic representation of a conventional simple parallel interference cancellation technique implemented at a base station (or node B).

FIG. 1 illustrates a conventional simple parallel interference cancellation technique implemented at the base station (or node B in a 3G system) when there is a cancellation of all the users in a system. A system with interference cancellation (IC) consists mainly of several cascaded detection units (e.g. RAKE receivers for descrambling and de-spreading) for each user. Each detection unit, after detection, regenerates a replica (re-spreading) of the signal based on the detected symbols, the estimated channel responses and the user's spreading codes. Then, the regenerated signal is inserted with the input of all the other active users' signal replicas from the previous stage. The replicas are subtracted (in order to cancel interference) from the original total received signal and a tentative symbol decision is formed using a standard RAKE receiver and a channel response estimator. The channel response estimator averages the pilot symbols from two consecutive slots of the uplink signal (for example, a WCDMA uplink signal) in order to form an estimate.

There can be as many stages as wanted, but every stage consumes a high number of baseband hardware resources. The simplest algorithm in terms of stages implies doing a de-spreading, then composing again the signal, subtracting from the rest of the users and resuming with a new de-spreading. Taking into account that most of the baseband processing is spent on the spreading/de-spreading process, the resources consumption is multiplied by 3 at least. For a given number of users in the system, the higher the amount of stages, the higher the uplink (UL) radio capacity required, as well as the higher the baseband consumption. As a consequence, the conventional static activation of interference cancellation (IC) can cause the blocking of resources assigned to other services.

In summary, the main drawback of current interference cancellation (IC) techniques is that they are baseband consuming, which means that their activation drains resources from other services considered of higher importance based on their impact on user perception (such as accessibility to speech) and on overall traffic usage (HSDPA). In order not to impact on the speech and HSDPA level of service (accessibility for speech, throughput for HSDPA), the only current available solution is to add additional baseband resources in order to reduce or compensate for the impact of interference cancellation.

Therefore, there is a need to optimize the application of current interference cancellation (IC) techniques to reduce, as much as possible, the blocking of baseband resources assigned to important services.

SUMMARY OF EXAMPLE EMBODIMENTS

In a first example embodiment there is provided a method of managing baseband resources in a mobile communications network, wherein at least one interference cancellation technique in uplink is available. The method comprises the steps of: when baseband resources are demanded by a mobile user, determining whether there are free baseband resources or not, and: if there are not free baseband resources, determining whether there is at least one interference cancellation process cancelling the interference caused by at least one mobile user or not, and: if there is at least one interference cancellation process cancelling the interference caused by at least one mobile user, one mobile user is removed from said interference cancellation process.

Preferably, if the step of determining whether there are free baseband resources or not results in that there are free baseband resources, an allocation of free baseband resources is executed.

Preferably, if the step of determining whether there is at least one interference cancellation process cancelling the interference caused by at least one mobile user or not, results in that there is not at least one interference cancellation process cancelling the interference caused by at least one mobile user, a congestion control algorithm is executed.

The step of determining whether there are free baseband resources or not, is preferably done either periodically or when a certain event is triggered.

If said step of determining whether there are free baseband resources or not is done when a certain event is triggered, said event which is triggered is the addition or reconfiguration of a new radio link. Alternatively, said event which is triggered is a demand of throughput from a HSDPA mobile user. In this embodiment, if the step of determining whether there is at least one interference cancellation process cancelling the interference caused by at least one mobile user or not, results in that there is not at least one interference cancellation process cancelling the interference caused by at least one mobile user, the available baseband resources are shared by all current mobile users.

Alternatively, said step of determining whether there are free baseband resources or not is done by a demand of throughput from an enhanced dedicated channel. This is preferably done after checking that there is no interference congestion between the mobile users. If there is interference congestion between the mobile users: it is determined whether there are free baseband resources or not, and if there are not free baseband resources, a congestion control algorithm is executed. Alternatively, if there is interference congestion between the mobile users: it is determined whether there are free baseband resources or not, and if there are free baseband resources, an interference cancellation process is triggered to reduce interference.

In a particular embodiment, the step of removing one mobile user from said interference cancellation process is done according to the following criterion: the mobile user causing less Rise-over-Thermal noise is removed.

In a particular embodiment, the method is managed by a scheduler at a base station or node B.

As can be observed, the usage of the conventional interference cancellation (IC) algorithms is linked to the effective level of traffic in the base stations or Node Bs, and more specifically to the amount of baseband resources being used in every moment. In the inventive method, the baseband utilization for IC (as well as its performance) is dynamically set on the basis of the current baseband consumption, in such a way that, if more baseband is needed in order to admit services that use, for example, DCH or HSDPA channels, the performances in the uplink are reduced and traded with more availability of baseband.

In a further embodiment there is provided a network entity of a mobile communications network comprising means for carrying out the above-mentioned method. In particular, it comprises: means for determining whether there are free baseband resources or not; means for determining whether there is at least one interference cancellation process cancelling the interference caused by at least one mobile user or not; means for adding or removing at least one mobile user from an interference cancellation process. That network entity is a base station or a node B.

Example embodiments also include a computer program comprising computer program code means adapted to perform the steps of the above-mentioned method when said program is run on a computer, a digital signal processor, a field-programmable gate array, an application-specific integrated circuit, a micro-processor, a micro-controller, or any other form of programmable hardware.

The advantages of the proposed invention will become apparent in the description that follows.

BRIEF DESCRIPTION OF THE DRAWINGS

To complete the description and in order to provide for a better understanding of the invention, a set of drawings is provided. Said drawings form an integral part of the description and illustrate an example embodiment of the invention, which should not be interpreted as restricting the scope of the invention, but rather as an example of how the invention can be embodied. The drawings comprise the following figures.

DESCRIPTION OF EXAMPLE EMBODIMENTS

In the context of the present invention, the term "call" refers to a packet-switched session or circuit-switched session over a radio bearer.

In this text, the term "comprises" and its derivations (such as "comprising", etc.) should not be understood in an excluding sense, that is, these terms should not be interpreted as excluding the possibility that what is described and defined may include further elements, steps, etc.

The implementation of an exemplary embodiment of the present invention can be carried out as follows:

When starting to admit users, the uplink interference cancellation is activated as it enhances the performance of the network in the uplink (this means that there is lower Rise Over Thermal for the same number of users). It is remarked that the algorithm used for interference cancellation is out of the scope of the present invention. Any of the conventional IC algorithms can be used with the herein described method. The activation of IC consumes a part of the installed NodeB baseband resources 213. The overall baseband allocation 21 procedure is depicted in FIG. 2.

Figure 2:
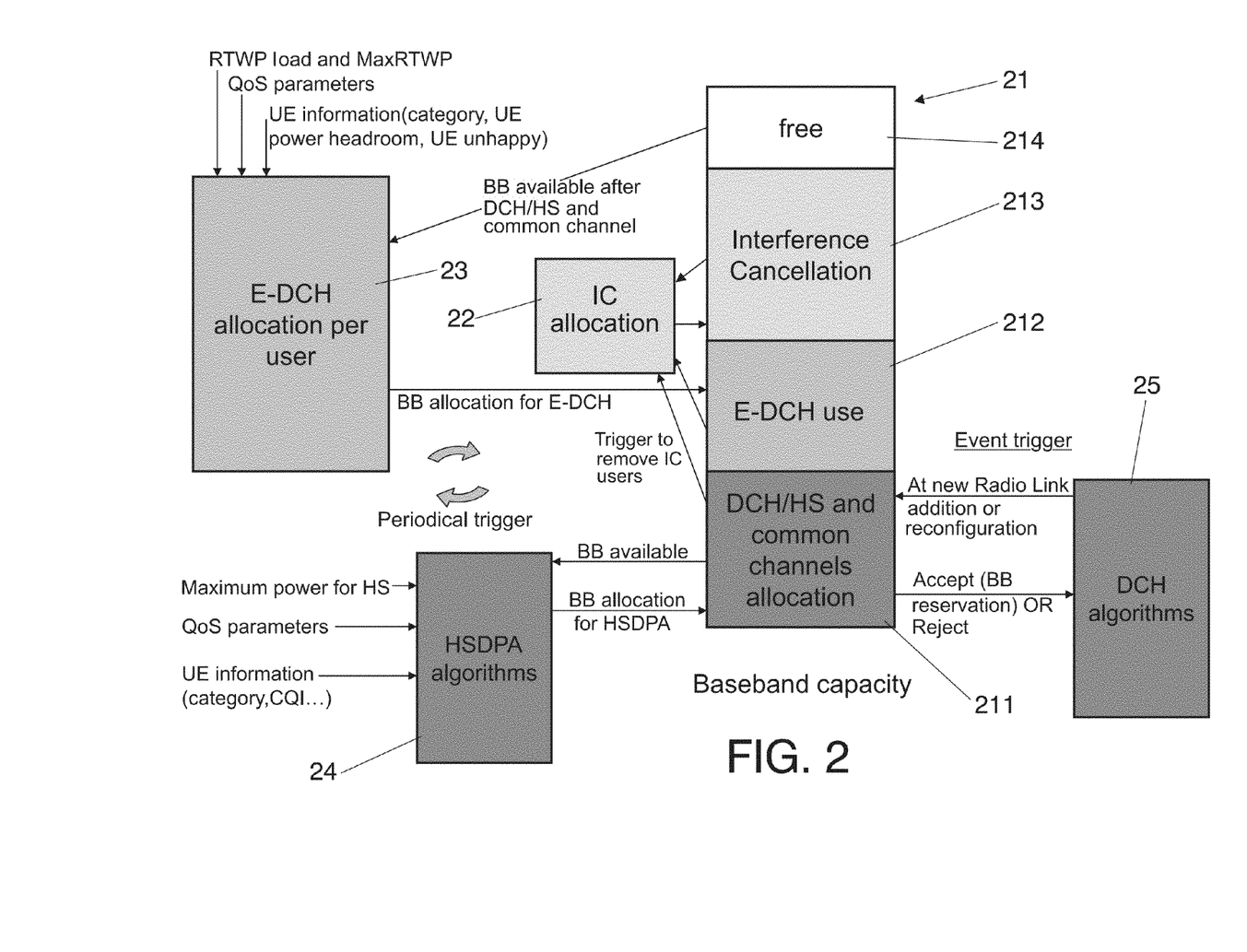
FIG. 2 shows a schematic representation of the consumption of baseband resources at a node B according to an embodiment of the present invention.

FIG. 2 shows a schematic representation of the consumption of baseband resources at a node B. Block 21 represents the total available baseband capacity. This total baseband capacity 21 is used for different purposes in a variable way, which is explained next.

First (meaning with a higher priority), the common channels, the dedicated channels (DCH) and the high speed channel (DCH/HS) are allocated, as shown in block 211. The dedicated channels (DCH) and the high speed channel (DCH/HS) comprise all the dedicated channels as described in Release' 99 of the UMTS standards (both uplink and downlink) and the HSDPA channels (downlink). The amount of baseband capacity 211 assigned to these channels is variable and depends on the traffic demand.

Once the common channels, dedicated channels and high speed channels are allocated, the enhanced dedicated ones (E-DCH) are assigned (block 212). These enhanced dedicated channels (E-DCH) are also known as the HSUPA channels (High Speed Uplink Packet Access). This allocation is also variable and also depends on the traffic demand.

After assigning the common, dedicated, high-speed and the enhanced dedicated channels, the remaining baseband capacity 213 is devoted to interference cancellation (IC) algorithms. Unlike in conventional IC techniques, which reserve a fixed amount of baseband resources to interference cancellation techniques, in the present invention this amount of baseband resources 213 dynamically changes in relation to the traffic demand.

Finally, in the event that, at a certain time instant, the common, dedicated, and high-speed channels 211, the enhanced dedicated ones 212 and the interference cancellation techniques 213 do not consume the whole available baseband capacity 21, some free baseband capacity 214 remains in the system.

It is remarked that block 21 and its sub-blocks 211 212 213 214 as illustrated in FIG. 2 represent a particular example of the baseband capacity allocation. This means that, for example, the common, dedicated and high-speed channels 211 and/or the enhanced dedicated ones 212 could consume so much baseband resources that very few ones could be dedicated to interference cancellation techniques 213. It is also possible that there are no free baseband resources 214 at all. This allocation is controlled by a scheduler at the node B.

Block 24 in FIG. 2 refers to the baseband resources demand of HSDPA algorithms. As can be observed, the main variables (or inputs) which affect such demand are: the maximum power for high speed (HS), the quality-of-service (QoS) parameters and the user equipment (UE) information, such as category, CQI, etc. From this information, the different HSDPA algorithms (which are out of the scope of the present invention) demand a certain baseband allocation of resources and get, as a response, a certain baseband allocation from the scheduler. This is normally done periodically.

Block 25 in FIG. 2 refers to the baseband resources demand of algorithms (which are out of the scope of the present invention) which manage dedicated channels (DCH), both uplink and downlink. Every time a new radio link is added or reconfigured, certain baseband allocation of resources is demanded to the scheduler of the node B. As a response, the demand is either accepted (and baseband resources are reserved) or rejected (in the event that there are no available baseband resources). This is normally done every time a new radio link is added or reconfigured.

Block 23 in FIG. 2 refers to the baseband resources demand of enhanced dedicated channels (E-DCH). Depending on the vendor implementation, this baseband resources demand 23 can apply not only to uplink E-DCH, but also to both uplink E-DCH and uplink DCH. As can be observed, the main variables (or inputs) which affect such demand are: the RTWP (Received Total Wideband Power) load and the maximum RTWP configured, the quality-of-service (QoS) parameters and the user equipment (UE) information, such as category, UE power headroom (amount of dB still available at a UE before it reaches a maximum transmitted power value) and the UE unhappiness. From this information, the different E-DCH algorithms which manage the E-DCH allocation per user (which are out of the scope of the present invention) demand the scheduler a certain baseband allocation of resources and get, as a response, from the total amount of baseband resources 21, certain baseband allocation. This is normally done periodically. This is done after the allocation of demanded baseband resources for common channels and DCH/HS channels (block 211) is fulfilled.

Next, block 22 and its interaction with other blocks of FIG. 2 are described. This block 22 represents the dynamic allocation of baseband resources as demanded by interference cancellation (IC) algorithms.

Block 22 refers to the baseband resources demand of interference cancellation (IC) algorithms (which are out of the scope of the present invention). As explained before, these IC algorithms are aimed at reducing the interference when decoding the data traffic of the users, but they consume baseband resources 21. An IC algorithm demands baseband resources to the baseband capacity 21 in order to execute the interference cancellation. If there are available resources after the common channels, the dedicated channels, the high speed channel (DCH/HS) and the enhanced dedicated channels (E-DCH) are allocated, some baseband resources 213 are assigned for interference cancellation. This differs from prior art methods, wherein a static (fixed) amount of baseband resources is assigned for IC techniques. Besides, when the demand for common channels, dedicated channels and high speed channel (DCH/HS) (box 211) and/or the demand for enhanced dedicated ones (E-DCH) (box 212) is high, the scheduler asks the IC algorithm 22 to remove IC users, thus releasing baseband resources 213.

Thus, the disclosed embodiment focuses on the IC baseband allocation/deallocation (boxes 22 and 213) and on their interaction with other boxes in the system, the baseband allocation for DCH, E-DCH and HSDPA being out of the scope of this invention.

As already explained, the current method considers the performance of IC techniques less important than the availability of baseband resources in order to provide accessibility for services that use DCH, HSDPA or E-DCH.

Figure 3:
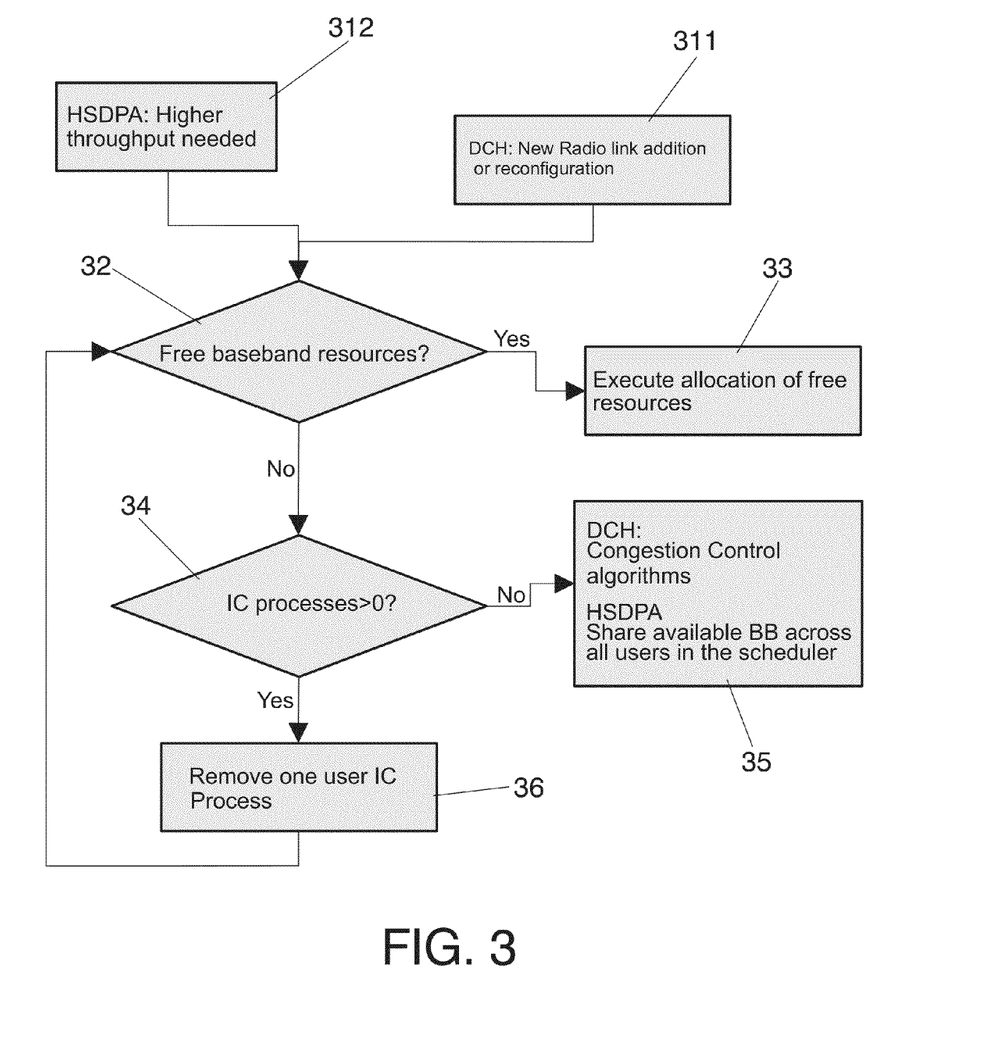
FIG. 3 shows a dataflow of the inventive method applied to dedicated and HSDPA channels according to an embodiment of the present invention.
Figure 4:
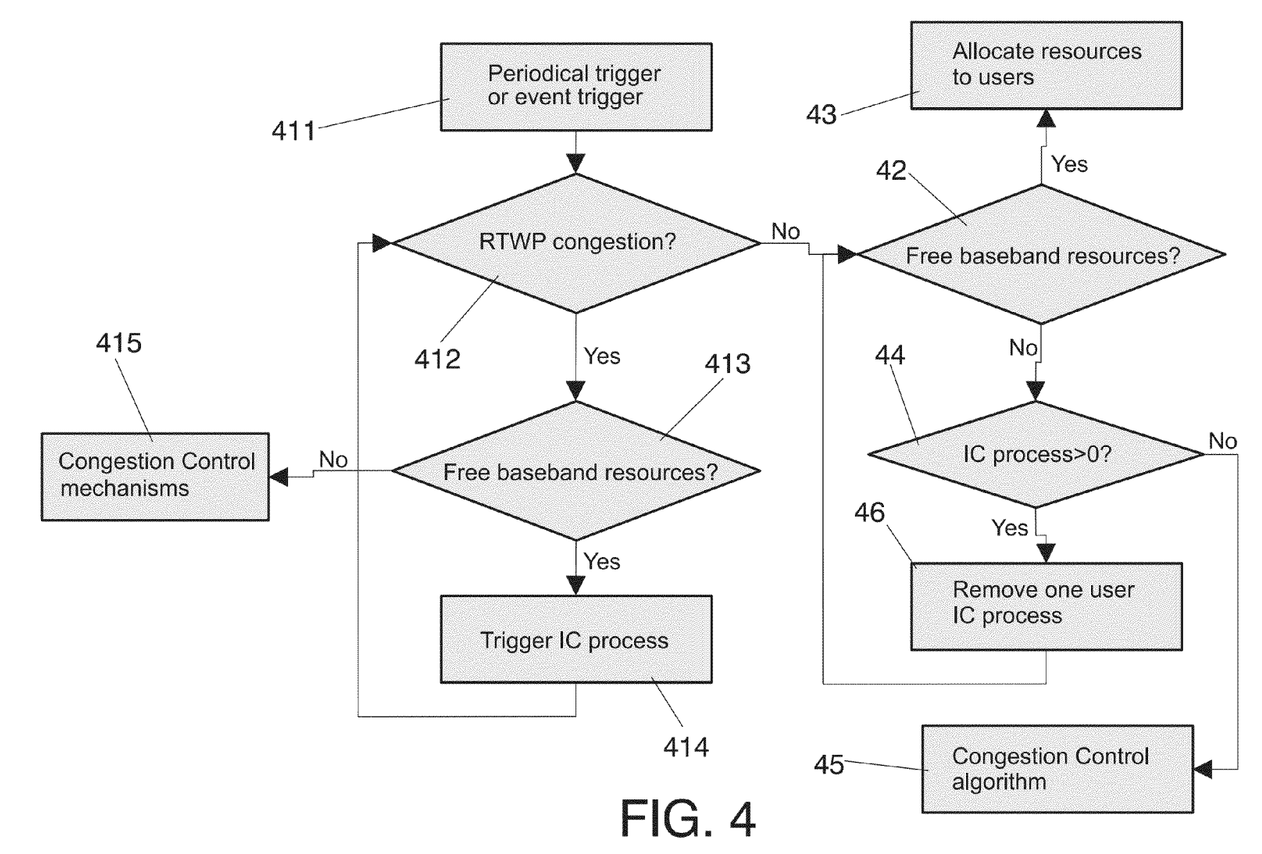
FIG. 4 shows a dataflow of the inventive method applied to enhanced dedicated channels according to an embodiment of the present invention.

The algorithm followed by the disclosed method is illustrated in FIGS. 3 (DCH and HSDPA) and 4 (E-DCH).

In particular, the algorithm used in relation to DCH and HSDPA channels is illustrated in FIG. 3 and is as follows:

On the one hand, the common channels are always reserved, and the dedicated channels (DCH) are reserved during the whole call, so the amount of assigned baseband resources for these channels 211 is maintained until an event is triggered. The algorithm at the scheduler of the Node B for these DCH channels is:

In the event that a new Radio Link (between user equipment and node B) is added or reconfigured (box 311), the Node B checks the baseband resources 21 (FIG. 2). If there are available (free) baseband resources (box 32), they are allocated to the demanded DCH (box 33):

---

If there is one or more users being cancelled in the IC process (that is to say, if an IC algorithm is being used for cancelling the contribution of one or more users) (box 34):
    While there is not enough BB resources to do the addition/reconfiguration of that new Radio

```
      Link (box 32), then
          The removal of one user consuming
          baseband resources allocated to IC is
          triggered (box 36), therefore freeing
          baseband resources.
      End While
  Else
      Do the typical RRM (radio resource management)
      algorithm actions for congestion control (box
      35), for example pre-emption methods, to
      allocate the user at expenses of downgrading
      other users/services with less importance.
  End
```

On the other hand, the algorithms which manage the HSDPA channels (box 24 in FIG. 2) behave in a different way: The scheduler periodically (for example, every 2 ms) checks if a higher throughput is required and allocates a certain amount of baseband resources to a user's HSDPA channel. It is remarked that the behaviour in relation to HSDPA channels is different from that of DCH: While DCH are either allocated or not, depending on the amount of baseband resources, the HSDPA channel can be assigned a higher or lower bit rate, depending on, amongst other reasons, the amount of available baseband resources 21 (FIG. 2).

If the average downlink (DL) throughput (measured over a period of time) per user or per cell is limited by the available bandwidth, and if the DL throughput can be significantly increased by reducing the IC performances (up to complete IC deactivation), the removal of IC users is triggered by the scheduler as in the DCH case until the target DL throughput (measured over time) is reached. The detailed steps of the algorithm at the scheduler of the Node B for these HSDPA channel are the same as that for the DCH and are also illustrated in FIG. 3:

In the event that a HSDPA channel requires a higher throughput (box 312), the Node B checks the baseband resources 21 (FIG. 2). If there are available (free) baseband resources (box 32), they are allocated to the demanded HSDPA (box 33):

```
  If there is one or more users being cancelled in
  the IC process (that is to say, if an IC algorithm
  is being used for cancelling the contribution of
  one or more users) (box 34):
      While there is not enough BB resources to do
      the increase of the HSDPA throughput (box 32),
      then
          The removal of one user consuming
          baseband resources allocated to IC is
          triggered (box 36), therefore freeing
          baseband resources.
      End While
  Else
      Share the available baseband resources across
      all users in the scheduler (box 35) according
      to an algorithm which is out of the scope of
      this invention (e.g. the proportional fair,
      round robin, etc.).
  End
```

FIG. 4 shows a dataflow of the inventive method applied to enhanced dedicated channels (E-DCH) (box 23 in FIG. 2) according to an embodiment of the present invention. The E-DCH are similar to the HSDPA but in Uplink, i.e. the system tries to maximise the throughput of the user. Therefore, either periodically or based on a certain event, the possibility of allocating more resources to provide more throughput when it is demanded by the UE is triggered (box 411). Then, the first thing to do is to check if the RTWP (interference) exceeds a certain congestion threshold (box 412).

```
  If there is no interference (RTWP) congestion (box
  412) then it is checked if:
      If there are free baseband resources (box 42),
      then they are allocated to the E-DCH users (box
      43).
      Else
          if there is at least one user in the IC
          process (box 44), then the removal of one
          user consuming baseband resources allocated
          to IC is triggered (box 46), thus freeing
          baseband resources. And the resources are
          then allocated.
          Else
              if there is no user in the IC process
              (box 44), then the conventional
              congestion control algorithms are
              triggered (box 45).
  Else
      if there is interference (RTWP) congestion (box
      412) then it is checked if:
          If there are free baseband resources (box
          413), an Interference cancellation process
          is triggered to reduce the interference.
          Else (if there are no free baseband
          resources (box 413)),
              then conventional congestion control
              processes are executed (box 45)
              typically to reduce the throughput and
              thus reduce the interference.
```

For these E-DCH, the goal is to use the maximum number of baseband resources 212 (FIG. 2) dynamically allocated to every user. For the E-DCH allocation of bit rate, the algorithm is performed periodically by the scheduler (for example, every 2 ms TTI (Transmission Time Interval), which is used for high category UEs). There are several inputs for the algorithm, as schematized in FIG. 2 (box 23):

The amount of available baseband capacity 21 after reserving the DCH, common channels and HSDPA 211.

The RTWP current load, which provides the interference generated in every moment, and the maximum RTWP that can be reached.

The information from the users, regarding QoS parameters to distribute accordingly the resources per priority and the information from the UL transmission such as UE category to know the maximum data rate, the UE power headroom to know if the UE can transmit with more power, and the UE happy/unhappy bit which gives information about the UE data buffer which requires more bit rate or not.

When the E-DCH bit rate per user is allocated based on the above-mentioned parameters, if the required baseband resources are not enough, the removal of IC users in the IC processes is again triggered.

Figure 5:
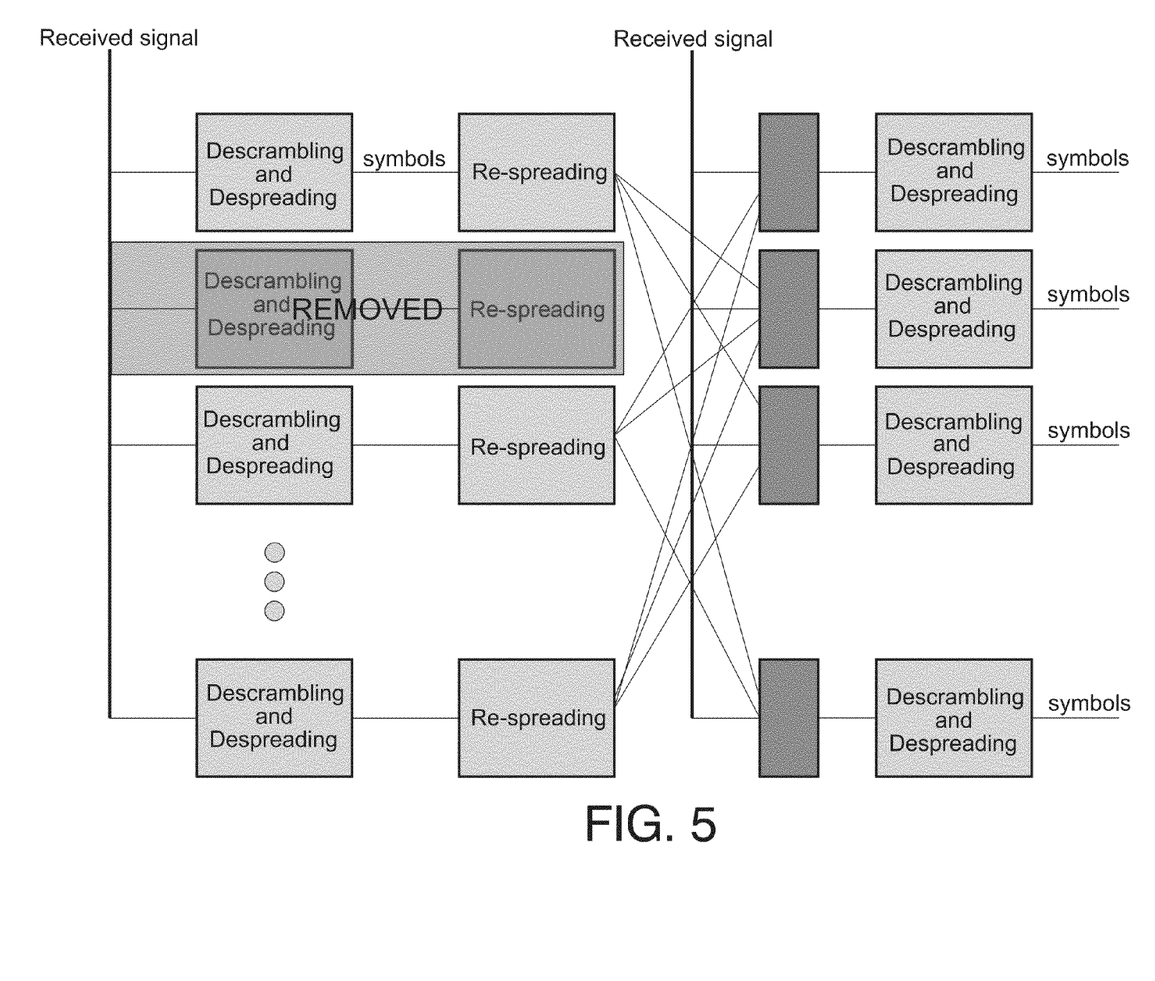
FIG. 5 shows a schematic representation of the removal of a user from an interference cancellation algorithm implemented at a base station (or node B) according to an embodiment of the present invention.

FIG. 5 shows a schematic representation of the removal of a user from an interference cancellation algorithm implemented at a base station (or node B).

Next, the criteria to select the user or users whose signals are to be removed from the IC process is as follows: There can be different alternatives to choose the user or users to be removed from the IC procedure. Preferably, the criterion is to remove the user causing less RoT (Rise over Thermal) noise. In this way the gain of the IC is maintained high because the interfering users which interfere the most are still cancelled.

Similarly, there can be an increase in the IC baseband 213 utilization: As already mentioned the used E-DCH algorithm allocates a certain bit rate to every user. This means that, based on the already mentioned parameters which influence the E-DCH allocation per user, the throughput in uplink is variable. If the most restrictive criterion is the RoT (Rise over Thermal) noise and there are available baseband resources 214, the IC can be activated and its performance increased by adding users to the IC process.

Next, the criteria to select the user or users whose signals are to be added to the IC process are described: Preferably, the chosen users are those which are the most interfering ones. Alternative criteria are also possible.

In conclusion, the invention enables operators of mobile communications networks to optimize the amount of baseband resources to be installed in situations in which interference cancellation (IC) is activated.

Although an exemplary embodiment has been described illustrating a situation in which the mobile communications network is a 3G network, in which case the method is executed in a node B, the invention is applicable to any mobile communications network in which interference cancellation techniques are available.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method of managing baseband resources in a mobile communications network, wherein at least one interference cancellation process for cancelling the interference caused by a mobile user in uplink is available to be implemented with the baseband resources, an amount of the baseband resources needed to implement the at least one interference cancellation process being dynamically allocated in relation to an amount of traffic of the mobile communications network such that a fixed amount of baseband resources are not allocated to the at least one interference cancellation process, the method comprising:
receiving a demand for baseband resources from a mobile user;
determining if there are any free baseband resources available for use by the mobile user;
in response to determining that no free baseband resources are available for use by the mobile user, determining that an amount of the baseband resources is being used by at least one interference cancellation process for cancelling interference of one or more mobile users; and
removing at least one mobile user of the one or more mobile users from the interference cancellation process so that an amount of the baseband resources is available for use by the mobile user making the demand.

2. The method of claim 1, wherein, if there are free baseband resources, an allocation of free baseband resources is executed.

3. The method of claim 1, wherein, if the at least one interference cancellation process is not using an amount of the baseband resources, a congestion control algorithm is executed.

4. The method of claim 1, wherein said step of determining whether there are free baseband resources, is done either periodically or when a certain event is triggered.

5. The method of claim 4, wherein said step of determining whether there are free baseband resources is done when a certain event is triggered, said event which is triggered being the addition or reconfiguration of a new radio link.

6. The method of claim 4, wherein said step of determining whether there are free baseband resources is done when a certain event is triggered, said event which is triggered being a demand of throughput from a HSDPA mobile user.

7. The method of claim 6, wherein the available baseband resources are shared by all current mobile users when the at least one interference cancellation process is not using an amount of the baseband resources.

8. The method of claim 4, wherein said step of determining whether there are free baseband resources is done by a demand of throughput from an enhanced dedicated channel.

9. The method of claim 8, wherein said step of determining whether there are free baseband resources is done after checking that there is no interference congestion between the mobile users.

10. The method of claim 9, wherein, if there is interference congestion between the mobile users,
and
if there are not free baseband resources, a congestion control algorithm is executed.

11. The method of claim 9, wherein, if there is interference congestion between the mobile users
and
if there are free baseband resources, an interference cancellation process is triggered to reduce interference.

12. The method of claim 1, wherein the mobile user causing less Rise-over-Thermal noise is removed first when a mobile user is removed from the at least one interference cancellation process.

13. The method of claim 1, said method being managed by a scheduler at a base station or node B.

14. A mobile communications network comprising a base station, the base station including baseband resources, wherein at least one interference cancellation process for cancelling the interference caused by a mobile user is available to be implemented with the baseband resources, an amount of the baseband resources needed to implement the at least one interference cancellation process being dynamically allocated in relation to an amount of traffic of the mobile communications network such that a fixed amount of baseband resources are not allocated to the at least one interference cancellation process, the base station configured to:
receive a demand for baseband resources from a mobile user;
determine if there are any free baseband resources available for use by the mobile user;
in response to determining that no free baseband resources are available for use by the mobile user, determine that an amount of the baseband resources is being used by at least one interference cancellation process for cancelling interference of one or more mobile users; and
remove at least one mobile user of the one or more mobile users from the interference cancellation process so that an amount of the baseband resources is available for use by the mobile user making the demand.

15. A computer program product comprising a non-transitory computer readable medium that stores computer executable instructions that when executed by a processor of a mobile communications network base station causes the base station to perform a method of managing baseband resources, wherein at least one interference cancellation process for cancelling the interference caused by a mobile user is available to be implemented with the baseband resources, an amount of the baseband resources needed to implement the at least one interference cancellation process being dynamically allocated in relation to an amount of traffic of the mobile communications network such that a fixed amount of baseband resources are not allocated to the at least one interference cancellation process, the method comprising:

receiving a demand for baseband resources from a mobile user;

determining if there are any free baseband resources available for use by the mobile user;

in response to determining that no free baseband resources are available for use by the mobile user, determining that an amount of the baseband resources is being used by at least one interference cancellation process for cancelling interference of one or more mobile users; and     removing at least one mobile user of the one or more mobile users from the interference cancellation process so that an amount of the baseband resources is available for use by the mobile user making the demand.

* * * * *